Nov. 14, 1967  F. M. STEWART III  3,352,051
COMBINATION FISHING LURE AND HOOK GUARD
Filed March 1, 1965
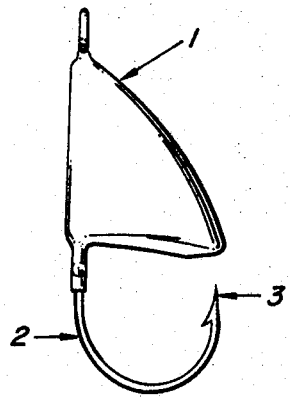
FIG. 1
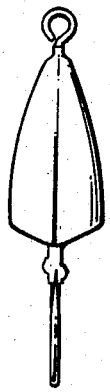
FIG. 2
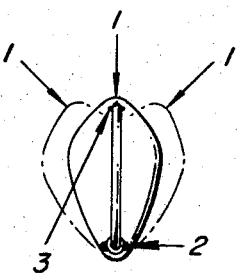
FIG. 3
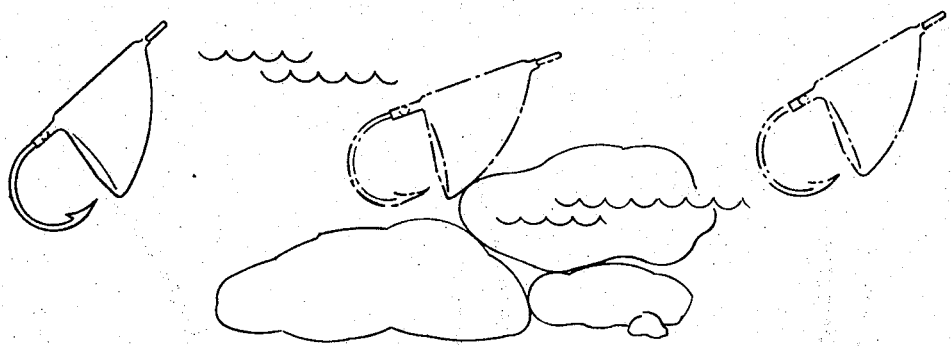
FIG. 4
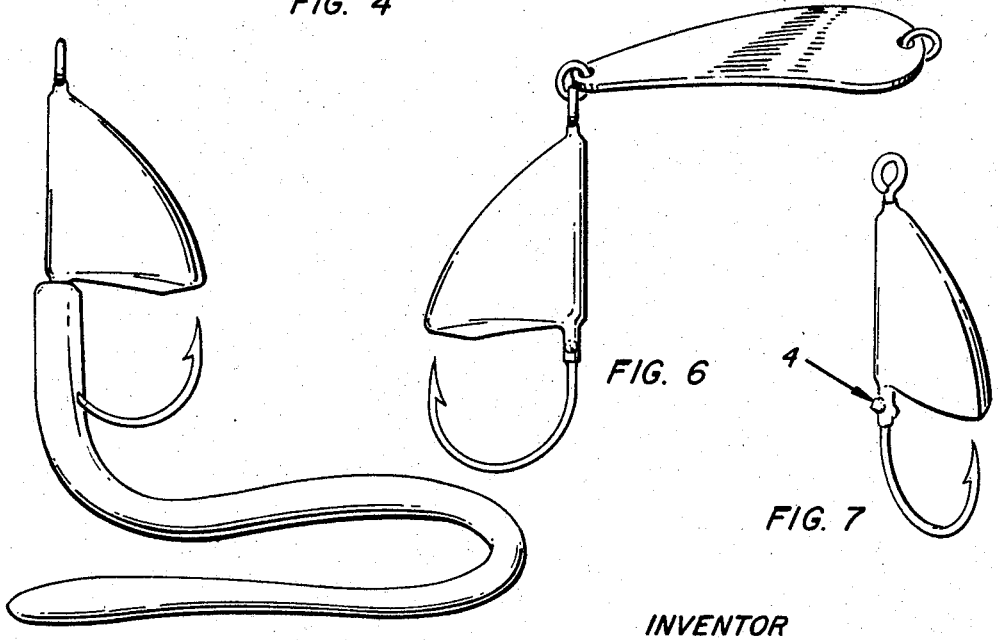
FIG. 5
FIG. 6
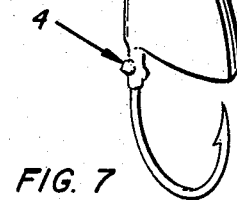
FIG. 7
INVENTOR
FRANCIS M. STEWART III

United States Patent Office 3,352,051
Patented Nov. 14, 1967

3,352,051
COMBINATION FISHING LURE AND HOOK GUARD
Francis M. Stewart III, 3307 Hutchens Ave., Huntsville, Ala. 35801
Filed Mar. 1, 1965, Ser. No. 436,149
1 Claim. (Cl. 43—42.1)

ABSTRACT OF THE DISCLOSURE

A combination fishing lure and hook guard having a body of flexible material cast or molded to the shank of a fish hook with a portion of the material being closely spaced from the point of the hook to shield the hook.

---

This invention serves as a combination fishing lure and hook-guard. The design is such that it will prevent fouling of the hook during retrieval and yet will provoke (or entice) strikes from game fish and permit hooking of same when a strike is received. The invention is normally used by casting and retrieving with a fishing rod and reel.

The invention is manufactured by casting or molding an elongated body of flexible material, such as polyvinyl chloride plastisol, to provide attachment to a metal hook by bonding either directly or by the use of substrate materials to enhance the adhesion. The configuration has an oblong or oval cross section and material properties are such that when taken into a fish's mouth the hook may be set by jerking or pulling an attached line so that force is applied to cause torsional deflection of the flexible body about the hook shank, thereby exposing the hook point and allowing penetration.

The hook guard feature is novel in that it does not depend on mechanical movement involving springs, linkages, or cams; compression of a flexible material; indentation of a hollowed-out body; nor deflection of a cantilevered or other leaf-type spring. Instead, it is essentially dependent upon its properly oriented shape and the torsional forces of the flexible material when torsionally deflected about the hook shank. Compression is minimized by the use of a type material, e.g. polyvinyl chloride plastisol, referred to above, which while flexible offers significant resistance to compression. While some compression occurs, typically it is minor.

An advantage of this invention over some "weedless" hook or lure devices, is that the guard is not "tripped" but returns to the normal hook shielding position if deflected by striking an obstruction, so that it maintains functional capability without manual reset throughout the cast and retrieval cycle.

The invention can be fabricated from solid, foam or composite materials to provide either a surface, i.e., floating, or subsurface lure without compromising its effectiveness either as a lure or hook-guard. Since the invention depends on neither a hollow nor hard material body construction, it can be fabricated with a natural bait "feel," thereby minimizing fish "spit-out" as is encountered with many artificial lures.

The nature of this invention also permits manufacture in a variety of colors, finishes, degrees of transparency (or translucency) and with changes in external configuration to the extent that they do not compromise the functional capability.

The primary object of this invention is to provide a non-fouling fishing lure which permits successful hooking of a fish at the initiation of the fisherman.

Further objects and advantages of the invention will be apparent from the following description when taken in conjunction with the accompanying drawings, wherein:

FIG. 1 is a side elevation view of the invention.
FIG. 2 is a front elevation of the invention.
FIG. 3 is a bottom view showing the relationship between hook and body in both the normal and deflected (hooking) positions.
FIG. 4 shows, in left to right travel, how the invention passes underwater obstructions.
FIG. 5 and FIG. 6 illustrate the use of ancillary lures.
FIG. 7 shows the typical integral holding protrusions for securing appended ancillary lures.

In reference to the drawings as they pertain to the hook guard feature of the invention, the flexible body 1 is attached to the hook shank 2 so that the point of the hook 3 is normally shielded. The body 1 has an oblong cross-section in the plane at right angles to the hook shank 2, as illustrated in FIG. 3, and when a force is applied to the exterior of the lure by a fish's mouth as a result of pulling or jerking an attached line, the body will momentarily deflect, essentially by torsional deflection (although compression and longitudinal deflection may occur to a minor degree), about the hook shank 2 to expose the hook point. This is accomplished by attaching one narrow side region of the body to the shank portion of the hook with the result that a central plane of the body extending along the length of the body is substantially coincident with the major axis of the oblong cross section of the body and substantially intersects an opposite narrow side region of the body, and an extension of this plane is substantially coincident with the plane of the metal hook. The resilient body extends rearward with respect to the shank portion from a first end position near an eye of the hook, and the width in the direction of the major axis, as seen in FIG. 1, increases gradually in dimension from this first end to or substantially to an opposite end. The configuration is such that the portion of the width, when measured at its point of maximum width, between the shank portion of the hook and the "opposite" narrow side of the resilient body, is slightly in excess of the distance between the shank and the pointed end of the hook. A portion of the opposite end of the resilient body, that is, the end opposite the end near the hook eye, is in near spaced relation with the point of the hook. The thickness of the body in the direction of the minor axis, as seen in FIG. 2, also increases gradually in dimension from the end of the resilient body near the hook eye rearward over substantially its entire length to a maximum width which is maintained to the opposite end. It is obvious that the hook guard feature is primarily dependent upon the flexibility of the body material, the configuration of the body and the relative position of body and hook shank.

Further, with the proper selection of material properties and configuration, the invention is extremely resistant to foul-hooking on the type of obstruction encountered by the fisherman, e.g., tree limbs, weeds, stumps and lily pads. The invention will slide over these obstructions during normal retrieval as illustrated in FIG. 4.

To enhance its attraction to fish, the invention can be used with attached artificial or natural lures such as a plastic worm, pork rind, or minnow as in FIG. 5. Alternately the invention can itself be attached to an artificial lure device such as a spoon as illustrated in FIG. 6.

An additional advantage of the invention over typical weedless hooks is that a holding protrusion 4, as in FIG. 7, can be molded to the hook during manufacture to secure attached lures.

Having thus described my invention, I claim:
A fish lure comprising:
 (A) a fish hook member comprising:
  (1) a straight shank portion,

(2) an eye on a forward end of said shank portion, and
(3) a hook portion having a pointed end, said hook portion extending from the rear end of said shank portion;

(B) an elongated body of resilient but of minor compressability, material and varying oblong cross section, said shank portion of said hook member being bonded to one narrow side region of and substantially along the entire length of said resilient body for providing an axis for torsional deflection of said body with respect to said shank and:

(1) said body being oriented wherein a central plane extending along the length of said resilient body is substantially coincident with the major axis of said oblong cross section and substantially intersects said narrow side region, and an extension of said plane is substantially coincident with said hook portion, (2) said body extends rearward with respect to said shank portion from a first end position near said eye, and the width in the direction of said major axis increases gradually in dimension from said first end position for substantially the entire length of the body, and wherein the portion of said width when measured at its point of maximum width between said shank portion and a narrow side of said resilient body opposite said one narrow side is slightly in excess of the distance between the shank and the pointed end of said hook, (3) a portion of said opposite end of said body is in near spaced relation with the said point of said hooked portion, and (4) the thickness of said body in the direction of the minor axis increases gradually in dimension from said first end rearward over substantially its entire length to a maximum width which is maintained to said opposite end.

References Cited
UNITED STATES PATENTS

| | | | |
|---|---|---|---|
| 385,913 | 7/1888 | Hunter | 43—44.8 |
| 1,157,772 | 10/1915 | Gebhardt | 43—44.8 |
| 2,158,924 | 5/1939 | Bouton | 43—42.1 |
| 3,133,373 | 5/1964 | Jeffers | 43—42.41 |

FOREIGN PATENTS 696,564    10/1964    Canada.

SAMUEL KOREN, *Primary Examiner.*

D. J. LEACH, *Assistant Examiner.*